United States Patent
Horita et al.

(10) Patent No.: US 9,957,912 B2
(45) Date of Patent: May 1, 2018

(54) INJECTION CONTROL APPARATUS FOR DIESEL ENGINE

(71) Applicant: KUBOTA Corporation, Osaka-shi, Osaka (JP)

(72) Inventors: Tatsuhiko Horita, Sakai (JP); Naruhiro Matsuo, Sakai (JP)

(73) Assignee: KUBOTA Corporation, Osaka-shi, Osaka (JP)

( * ) Notice: Subject to any disclaimer, the term of this patent is extended or adjusted under 35 U.S.C. 154(b) by 32 days.

(21) Appl. No.: 15/081,078

(22) Filed: Mar. 25, 2016

(65) Prior Publication Data
US 2016/0290275 A1    Oct. 6, 2016

(30) Foreign Application Priority Data

Mar. 31, 2015 (JP) ................................. 2015-072622

(51) Int. Cl.
| | |
|---|---|
| *F02D 41/40* | (2006.01) |
| *F02D 41/20* | (2006.01) |
| *F02M 51/06* | (2006.01) |

(52) U.S. Cl.
CPC ........... *F02D 41/401* (2013.01); *F02D 41/20* (2013.01); *F02M 51/061* (2013.01);
(Continued)

(58) Field of Classification Search
CPC ........ F02D 41/40; F02D 41/401; F02D 41/20; F02D 41/06; F02D 41/062; F02D 41/064;
(Continued)

(56) References Cited

U.S. PATENT DOCUMENTS

| | | | | |
|---|---|---|---|---|
| 6,014,956 A | * | 1/2000 | Cowden | F02D 41/20 123/381 |
| 6,532,940 B1 | * | 3/2003 | Ono | F02D 41/20 123/490 |

(Continued)

FOREIGN PATENT DOCUMENTS

| | | |
|---|---|---|
| EP | 0893594 A2 | 1/1999 |
| EP | 1072779 | 1/2001 |

(Continued)

OTHER PUBLICATIONS

Extended Search Report dated Jul. 29, 2016 in EP Application No. EP 16162269.1.

*Primary Examiner* — Lindsay Low
*Assistant Examiner* — George Jin
(74) *Attorney, Agent, or Firm* — Panitch Schwarze Belisario & Nadel LLP

(57) ABSTRACT

An injection control apparatus includes an injector for injecting fuel which is accumulated under pressure toward a combustion chamber, an injector driver for supplying a current to an electromagnetic actuator used for a solenoid valve, and a state detection unit for detecting a state of an engine or an ambient environment. A valve opening control unit supplies a first current to the electromagnetic actuator for opening the solenoid valve. An opened-state maintaining control unit supplies a second current to the electromagnetic actuator for maintaining the solenoid valve continuously in an opened position. A timing control unit variably adjusts a period of time from a starting time of the valve opening control unit to a time when the opened-state maintaining control unit becomes active in place of the valve opening control unit, in accordance with a result of detection provided by the state detection unit.

5 Claims, 6 Drawing Sheets

(52) U.S. Cl.
CPC .......... *F02D 2200/021* (2013.01); *F02D 2200/0602* (2013.01); *F02D 2200/0606* (2013.01)

(58) Field of Classification Search
CPC ............ F02D 41/3818; F02D 41/3827; F02D 41/402; F02D 2041/2055; F02D 2200/0606; F02D 2200/021; F02D 2200/0602; F02D 2200/503; F02D 2200/0618; F02M 51/061; F02M 65/005; F02M 65/00
See application file for complete search history.

(56) References Cited

U.S. PATENT DOCUMENTS

| | | | | |
|---|---|---|---|---|
| 2003/0213470 | A1* | 11/2003 | Kohketsu | F02D 41/3836 123/447 |
| 2004/0025849 | A1* | 2/2004 | West | F02D 41/3836 123/480 |
| 2006/0137661 | A1* | 6/2006 | Hayakawa | F02D 41/20 123/499 |
| 2008/0017172 | A1* | 1/2008 | Kojima | F02D 41/20 123/478 |

FOREIGN PATENT DOCUMENTS

| | | |
|---|---|---|
| EP | 1193384 A2 | 4/2002 |
| WO | 9932776 | 7/1999 |
| WO | 0206657 A1 | 1/2002 |
| WO | 2011046074 A1 | 4/2011 |

\* cited by examiner

FIG. 6

| WATER TEMPERATURE (degC) | -40 | -20 | -10 | 0 | 20 | 100 | 110 |
|---|---|---|---|---|---|---|---|
| EXTRA TIME OF FIRST HOLD (μs) | 200 | 50 | 30 | 10 | 0 | 0 | -50 |

INJECTION CONTROL APPARATUS FOR DIESEL ENGINE

BACKGROUND OF THE INVENTION (1) Field of the Invention

The present invention relates to an injection control apparatus for a diesel engine.

(2) Description of Related Art

In a common rail system (CRS) diesel engine for general purpose use including an industrial use, an agricultural use, and the like, a microprocessor unit (MPU) for exerting main control and a driver for driving hardware are provided within an engine control unit (ECU). A driver for driving an injector plays an important role in control of an engine, and is called an "injector driver". An MPU is an injection control apparatus which calculates an injection timing and an injection time, and provides an instruction signal indicating a suitable injection timing and a suitable injection time to a so-called injector driver described above.

Generally, a current is fed to an injector driver in two stages of a stage in which a current of a first hold is fed and a stage in which a current of a second hold is fed. For a current of a first hold, a large current is required in order to open a core valve. On the other hand, a current of a second hold may be a current smaller than the current of the first hold because the current of the second hold has only to maintain the opened core valve. Accordingly, an apparatus is known which is configured to achieve reasonable injection using the above-described two-stage injection in which a strong current is firstly fed and thereafter a weak current is fed.

Conventionally, in an injection control apparatus, a time of a first hold of a driving current for the injector described above is generally set to a predetermined time having an optimum value. However, even though an MPU is arranged so as to control driving of the injector with a time of a first hold being set to an optimum value, an actual injection amount may probably vary by various factors such as a temperature condition.

Therefore, it is impossible to follow a change in an environmental condition or the like by only providing an apparatus which sets a time of a first hold to an optimum value in design phase. This may result in an increase or a decrease of an actual amount of injection from the injector with respect to an indicated amount of injection, and thus, such an apparatus still has room for improvement as the injection control apparatus.

SUMMARY OF THE INVENTION

An object of the present invention is to provide an improved injection control apparatus for a diesel engine, which allows for a satisfactory engine starting while achieving a first hold for opening a valve and a second hold for maintaining a valve-opened state even if a change occurs in various conditions such as a temperature condition at the time of engine start.

The present invention is directed to an injection control apparatus for a diesel engine, the apparatus including: an injector for injecting fuel which is accumulated under pressure toward a combustion chamber upon opening of a solenoid valve; an injector driver for supplying a current to an electromagnetic actuator which controls an opening operation and a closing operation of the solenoid valve; a state detection unit for detecting a state of an engine or a state of an ambient environment; a valve opening control unit for supplying, to the electromagnetic actuator, a first current for opening the solenoid valve; an opened-state maintaining control unit for supplying, to the electromagnetic actuator, a second current for maintaining the solenoid valve, which is opened by the valve opening control unit, continuously in an opened position; and a timing control unit for variably adjusting a period of time from a starting time of the valve opening control unit to a time when the opened-state maintaining control unit becomes active in place of the valve opening control unit, in accordance with a result of detection provided by the state detection unit.

According to the present invention, the injection control apparatus includes the timing control unit for variably adjusting a period of time from a starting time of the valve opening control unit to a time when the opened-state maintaining control unit becomes active in place of the valve opening control unit in accordance with a result of detection provided by the state detection unit. Thus, a current-flowing time of the first current (first hold time) for opening the solenoid valve, the time which has been conventionally fixed, is made variable, in other words, programmable.

More specifically, a period of time during which a current of a first hold for opening a valve is fed is variably set in accordance with a result of detection provided by the state detection unit, so that an actual amount of injection from the injector can be equated with an injection amount indicated by the injection control apparatus even if a change occurs in a state of an engine, an environmental condition, or the like.

As a result, it is possible to provide an improved injection control apparatus for a diesel engine, which allows for satisfactory engine starting while achieving a first hold for opening a valve and a second hold for maintaining a valve-opened state even if a change occurs in various conditions such as a temperature condition at the time of engine start.

BRIEF DESCRIPTION OF DRAWINGS

FIG. 5 is an explanatory diagram showing waveforms of an injector driving current and the like; and FIG. 6 is a chart showing a relationship between a water temperature and an extra time of a first hold in an injection control apparatus.

DETAILED DESCRIPTION OF PREFERRED EMBODIMENTS

Hereinafter, a preferred embodiment of an injection control apparatus for a diesel engine according to the present invention will be described with reference to accompanying drawings, taking as an example a case where a diesel engine is a common rail system (CRS) diesel engine for an agricultural use which is employed in a tractor or the like.

Figure 1:
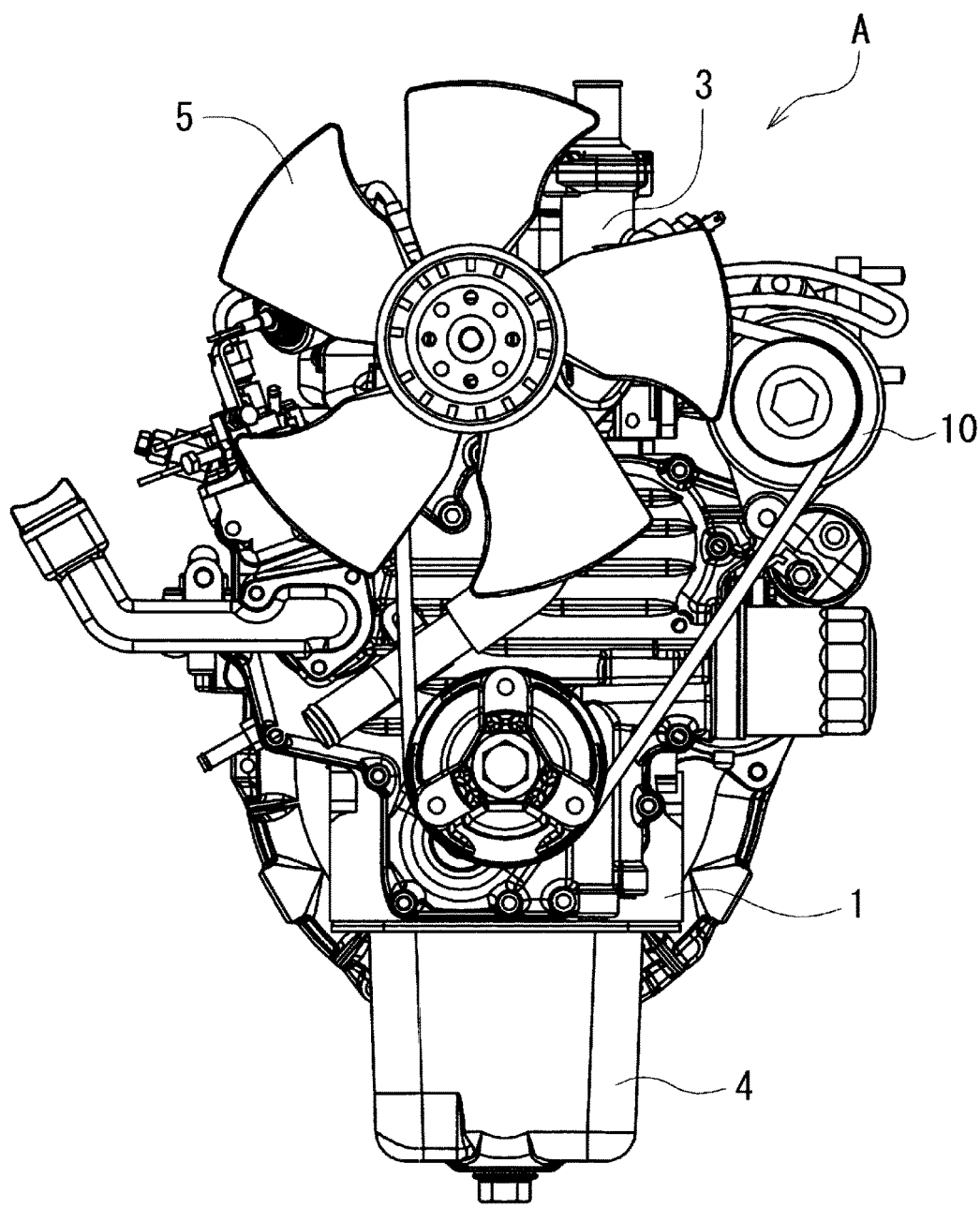
FIG. 1 is a front view of a common rail system (CRS) diesel engine.
Figure 2:
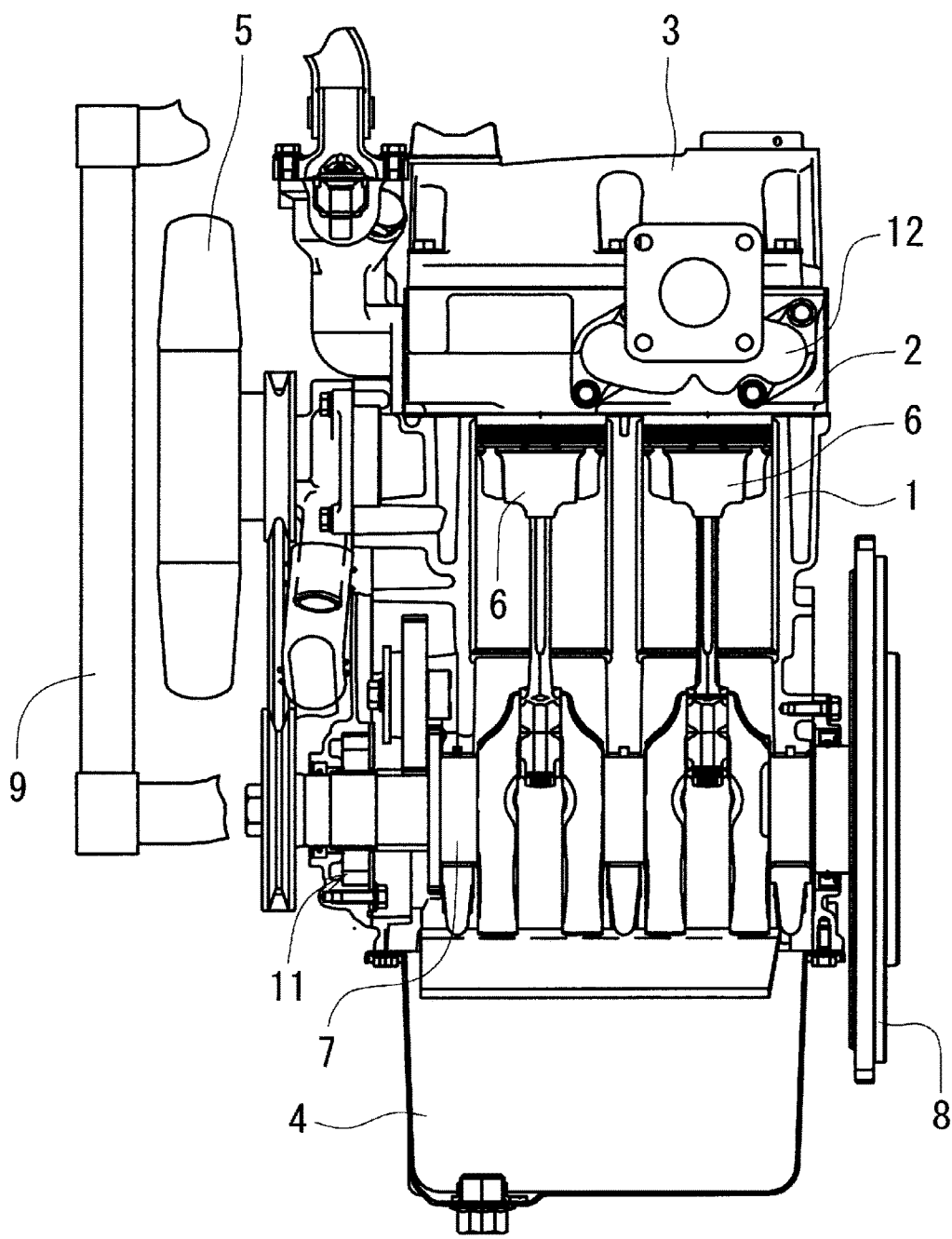
FIG. 2 is a side view of the diesel engine shown in FIG. 1, in which some part is omitted.

As shown in FIGS. 1 and 2, a CRS diesel engine A of an overhead valve type (OHV type) includes a cylinder 1, a cylinder head 2, a head cover 3, an oil pan 4, a cooling fan 5, a piston 6, a crank shaft 7, a flywheel 8, a radiator 9, a dynamo 10, an oil pump 11, an exhaust manifold 12, and a rail 40 (common rail 40).

Figure 3:
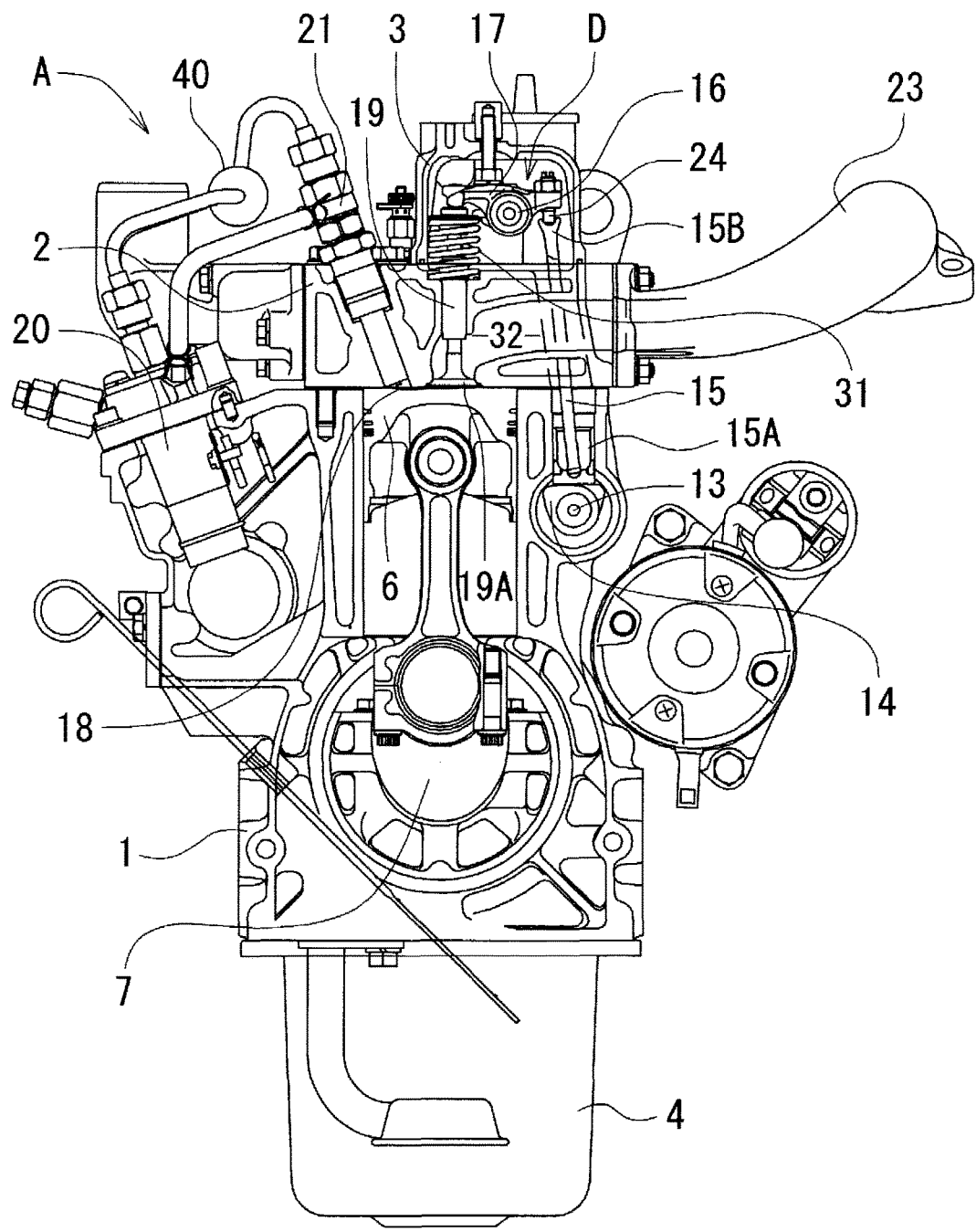
FIG. 3 is a front view of a section of the diesel engine shown in FIG. 1.

As shown in FIG. 3, a valve mechanism D of the diesel engine A includes a cam shaft 13 which is driven by the crank shaft 7 via a gear mechanism not shown, a cam 14 which is attached to the cam shaft 13 so that the cam 14 can rotate integrally with the cam shaft 13, a push rod 15 which is pushed and driven by the cam 14, a rocker arm 17 which is pivotally supported by an arm shaft 16 provided in the head cover 3 so as to be rockable, and an intake valve 19 including a valve body 19A which faces a combustion chamber 18.

Further, in FIG. 3, a reference symbol "20" denotes a fuel supply pump, a reference symbol "21" denotes an injector (fuel injector), and a reference symbol "23" denotes an intake manifold.

As shown in FIG. 3, the push rod 15 placed vertically has a lower end part at which a tappet 15A which is in sliding contact with the cam 14 is supported through spherical fitting so that the push rod 15 and the tappet 15A can move relatively to each other. Also, the push rod 15 has an upper end part at which a pushing end 15B is formed.

The rocker arm 17 which is pivotally supported by the cylindrical arm shaft 16 has an end part on a base side thereof which is closer to the push rod, at which a shaft pin 24 together with a rock nut (not denoted by a reference symbol) is screwed. Also, the rocker arm 17 has a tip part, below which the intake valve 19 is provided.

Next, an injection control apparatus for controlling injection of fuel in the above-described diesel engine will be described.

Figure 4:
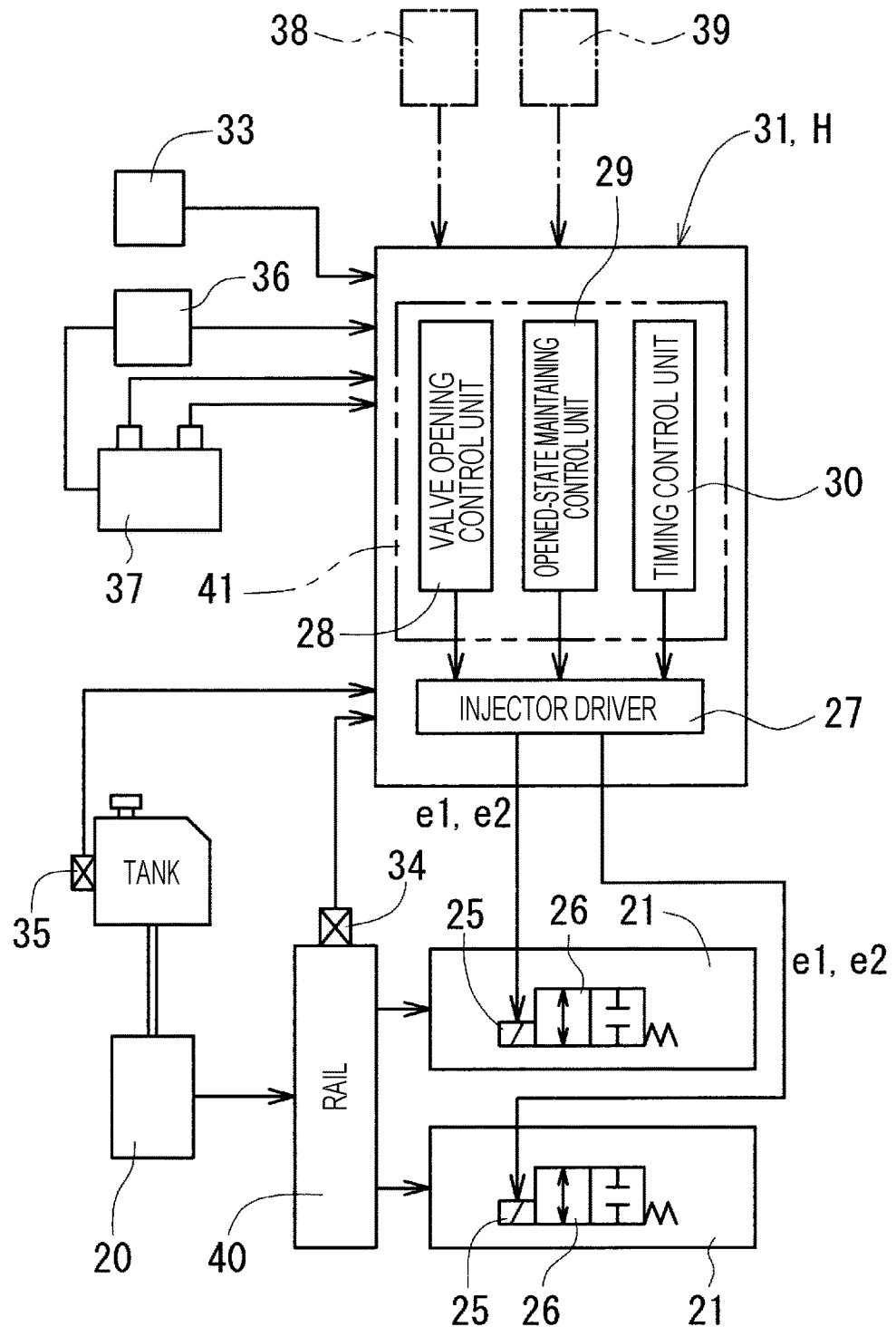
FIG. 4 is a block diagram showing an injection control apparatus for a diesel engine.

As shown in FIG. 4, the diesel engine A includes an ECU 31 as a control unit, to which various state detection units s, a battery 37, a plurality of injectors (fuel injectors) 21, and the like are conductively connected.

The various state detection units s include a water temperature gauge 33 for measuring a temperature of cooling water, a fuel pressure sensor 34 for measuring a common rail pressure, a fuel temperature detection sensor 35 for measuring a temperature of fuel, and a voltmeter 36 for measuring a voltage of the battery 37. The state detection units s may also include a thermometer 38 for measuring an outside air temperature and a hygrometer 39.

The injector 21 provided in each of cylinders includes a solenoid valve 26 for injecting high-pressure fuel which is sent from the fuel supply pump 20 via the rail 40, and a solenoid (an example of an electromagnetic actuator) 25 which controls opening and closing of the solenoid valve 26. As a result of a valve opening operation in which the solenoid valve 26 being urged to be closed is shifted to an opened position through energization of the solenoid 25, the injector 21 is allowed to inject high-pressure fuel toward the combustion chamber 18.

The diesel engine A is provided with an injection control apparatus H utilizing the ECU 31. That is, the diesel engine A includes the injector 21 for injecting fuel which is accumulated under pressure toward the combustion chamber 18 upon opening of the solenoid valve 26 in a closed position, an injector driver 27 for supplying a current to the solenoid 25 which controls an opening operation and a closing operation of the solenoid valve 26, and a plurality of state detection units s for detecting a state of an engine or a state of an ambient environment.

Further, the ECU 31 is provided with a valve opening control unit 28 which supplies, to the solenoid 25, a first current e1 for opening the solenoid valve 26 in a closed position, and an opened-state maintaining control unit 29 which supplies, to the solenoid 25, a second current e2 for maintaining the solenoid valve 26, which is opened by the valve opening control unit 28, continuously in an opened position. The ECU 31 further includes a timing control unit 30 for variably adjusting a period of time from a starting time of the valve opening control unit 28 to a time when the opened-state maintaining control unit 29 becomes active in place of the valve opening control unit 28, that is, a "first hold time t1", in accordance with a result of detection provided by each of the various types of state detection units s.

Figure 5:
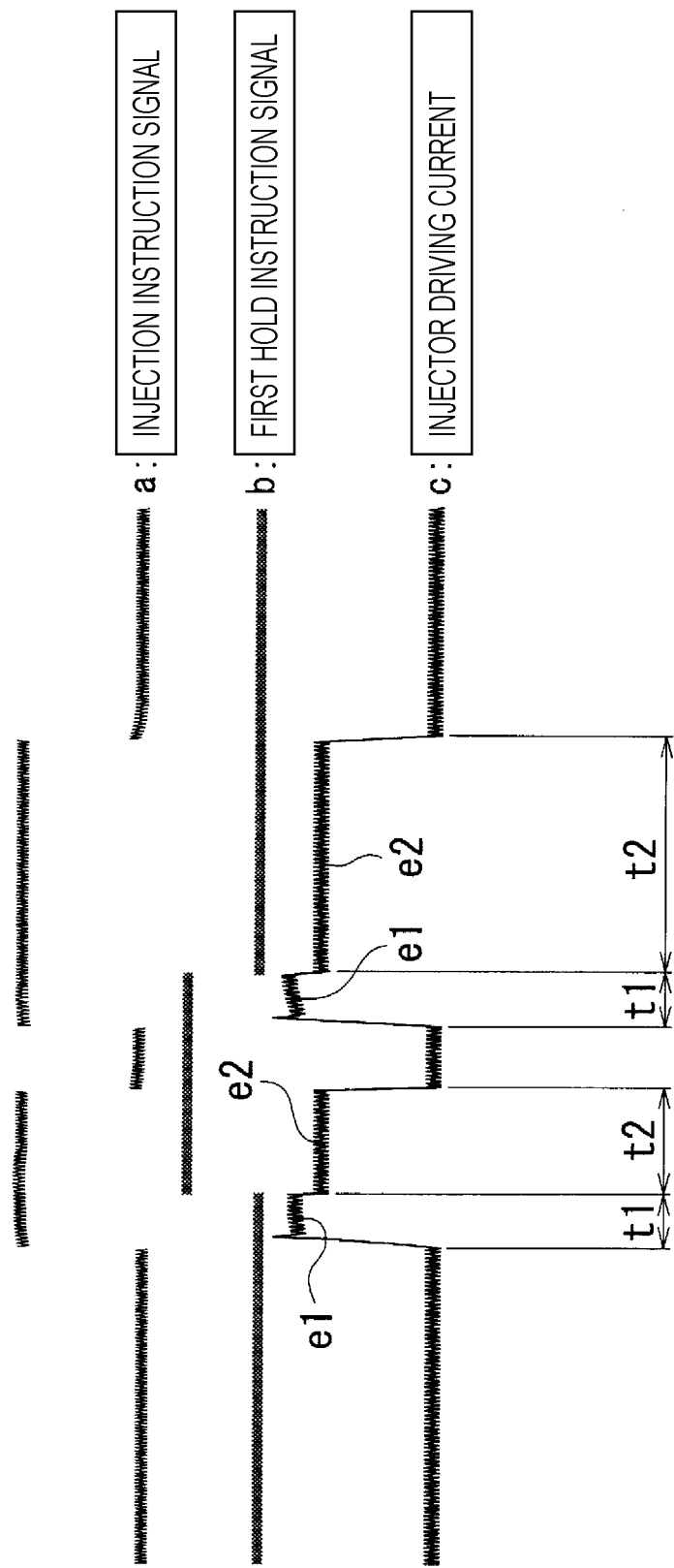

As shown in FIG. 5, the timing control unit 30 is a unit for variably setting a first hold time t1 during which the first current e1 is being fed, in accordance with a result of detection provided by the state detection unit s.

That is, the ECU 31 includes the valve opening control unit 28, the opened-state maintaining control unit 29, and the timing control unit 30. Further, the state detection unit s includes one or more of a water temperature gauge 33 for measuring a temperature of cooling water, a fuel pressure sensor 34 for measuring a common rail pressure, a fuel temperature detection sensor 35 for measuring a temperature of fuel, and a voltmeter 36 for measuring a voltage of a battery.

Herein, a state in which the first current e1 is flowing is referred to as a "first hold", and a state in which the second current e2 is flowing is referred to as a "second hold". A current-flowing time of the first current e1 (time of a first hold) is referred to as a "first hold time t1", and a current-flowing time of the second current e2 (time of a second hold) is referred to as a "second hold time t2". Further, a CPU 41 is configured by a circuit including the valve opening control unit 28, the opened-state maintaining control unit 29, and the timing control unit 30. The second current e2 may have a smaller value than the first current e1.

A standard time (example of a standard time) of a first hold time t1 associated with the injector 21 is, for example, 500 μs.

It is designed such that a first hold time t1 can be variably set, with the aim of controlling a lift amount of a core valve (a core valve of the solenoid valve 26) so as to be constant in a certain current-flowing time irrespective of a state of an ambient environment or a state of an injector, to thereby eliminate variation in an injection amount caused by the injector 21.

Therefore, in an environment where the injector 21 is provided, in a case where it is determined that a core valve has greater difficulty in moving as compared to a core valve in a reference state, a first hold time t1 is controlled to be longer than a standard time by the injection control apparatus H.

Description will be made on a case where a first hold time t1 is made longer than a standard time in the injection control apparatus H. FIG. 6 shows a relationship between a water temperature which is a temperature of cooling water and an extra time which is added to a first hold time t1. As can be seen from FIG. 6, the extra time is 200 μs when the water temperature is −40° C., and the extra time is 50 μs when the water temperature is −20° C. Further, the extra time is zero when the water temperature is in a range of 20° C. to 100° C. Meanwhile, when the water temperature is 110° C., the first hold time t1 is made shorter than the standard time by 50 μs.

In FIG. 5, a reference symbol "a" denotes an injection instruction signal, a reference symbol "b" denotes a first hold instruction signal, and a reference symbol "c" denotes an injector driving current for operating the injector driver 27. In the injection control apparatus H, an instruction is given in the following ways. The CPU 41 may output a signal which indicates a time for a first hold time t1 to the injector driver 27 from a port which is different from a port of instruction for injection from the injector 21. Also, the CPU 41 may cause a single port to support all of cylinders and all of the injectors 21. Further, there is another possible way of control in which an instruction signal is toggled when an instruction for completion of a first hold is given and an instruction is given to the injector driver 27 when both edges are detected.

Other examples of control exerted by the injection control apparatus H are as described in the following 1 to 3.

1. A first hold time t1 (a current-flowing time of the first current e1) is made longer when the fuel pressure sensor 34 detects a low common rail pressure, and a first hold time t1 is made shorter when the fuel pressure sensor 34 detects a high common rail pressure.

2. A time of a first hold is made longer when the fuel temperature detection sensor 35 detects a low temperature of fuel in a fuel tank, and a time of a first hold is made shorter when the fuel temperature detection sensor 35 detects a high temperature of fuel in a fuel tank.

3. A time of a first hold is made longer when the voltmeter 36 detects a low voltage of the battery 37, and a time of a first hold is made shorter when the voltmeter 36 detects a high voltage of the battery 37.

Next, description will be made on a case where a first hold time t1 is made shorter than a standard time. Similarly to the above case where the first hold time t1 is made longer than the standard time, in an environment where the injector 21 is provided, when it is possible to determine that a core valve can move more easily than a core valve in a reference state, the first hold time t1 is controlled to be shorter than the standard time. An example of such a case is when the water temperature is 110° C. in FIG. 6.

The CPU 41 senses a common rail pressure, a water temperature of cooling water for an engine, a temperature of fuel, a voltage of a battery, and the like, and calculates a time of a first hold based on data (values) obtained by sensing. Then, in accordance with a result of the calculation, an instruction is given from the CPU 41 to the injector driver 27. Generally, in giving an instruction for injection from the CPU 41 to the injector driver 27, an instruction is given by using at least one line for one cylinder between 0 V (Low) and 5 V (High). For a four-cylinder engine, at least four lines are necessary. Then, as possible ways to variably set a first hold time t1, the following 4 and 5 can be conceived.

4. Performance of the injector driver 27 is enhanced, so that a variable time of a first hold time t1 is incorporated in logic.

5. At least one line from the CPU 41 to the injector driver 27 is additionally included for each cylinder, and a "High" signal is sent during a time of a first hold.

The injection control apparatus H according to the present invention is configured such that an instruction is given with a Low/High signal along one line irrespective of how many cylinders are included or whether or not multi-stage injection is performed. Therefore, it is possible to variably set a first hold time t1 with the injector driver 27 having a simple structure, which results in reduction in a cost. The injection control apparatus H according to the present invention, which uses only one line, is more preferable than an apparatus using many lines also in terms of noise resistance.

(Another Preferred Embodiment)

The injection control apparatus H may variably adjust a ratio of a first hold time t1 to a sum of a first hold time t1 and a second hold time t2 in accordance with a result of detection provided by the state detection unit s. In such a case, provided is an injection control apparatus for a diesel engine including a timing control unit 30 for variably adjusting a ratio (t1/t1+t2) of a time required for the valve opening control unit 28 (i.e., a first hold time t1) to a sum (t1+t2) of either a period of time from a starting time of the valve opening control unit 28 to a time when the opened-state maintaining control unit 29 becomes active in place of the valve opening control unit 28, or a time required for the valve opening control unit 28 (i.e., a first hold time t1), and a time required for the opened-state maintaining control unit 29 (i.e., a second hold time t2), in accordance with a result of detection provided by the state detection unit s.

What is claimed is:

1. An injection control apparatus for a diesel engine, comprising:
   an injector for injecting fuel which is accumulated under pressure toward a combustion chamber upon opening of a solenoid valve;
   an injector driver for supplying a current to an electromagnetic actuator which controls an opening operation and a closing operation of the solenoid valve;
   a state detection unit for detecting a state of an engine or a state of an ambient environment;
   a valve opening control unit for supplying, to the electromagnetic actuator, a first current for opening the solenoid valve;
   an opened-state maintaining control unit for supplying, to the electromagnetic actuator, a second current for maintaining the solenoid valve, which is opened by the valve opening control unit, continuously in an opened position; and
   a timing control unit for variably adjusting a period of time from a starting time of the valve opening control unit to a time when the opened-state maintaining control unit becomes active in place of the valve opening control unit, in accordance with a result of detection provided by the state detection unit,
   wherein the state detection unit includes a fuel temperature detection sensor, for measuring a temperature of fuel, and one or more selected from a group consisting of a water temperature gauge, a fuel pressure sensor, and a voltmeter,
   wherein the valve opening control unit includes one or more selected from a group consisting of a CPU, a CPU and the injector driver, and an engine control unit (ECU),
   wherein the opened-state maintaining control unit includes one or more selected from a group consisting of a CPU, a CPU and the injector driver, and an ECU, and
   wherein the timing control unit includes one or more selected from a group consisting of a CPU and an ECU.

2. The injection control apparatus for a diesel engine according to claim 1, wherein the valve opening control unit, the opened-state maintaining control unit, and the timing control unit are each an ECU.

3. The injection control apparatus for a diesel engine according to claim 1, wherein the water temperature gauge is configured to measure a temperature of cooling water, the fuel pressure sensor is configured to measure a common rail pressure, the fuel temperature detection sensor is configured to measure a temperature of fuel, and the voltmeter is configured to measure a voltage of a battery.

4. The injection control apparatus for a diesel engine according to claim 2, wherein the water temperature gauge is configured to measure a temperature of cooling water, the fuel pressure sensor is configured to measure a common rail pressure, the fuel temperature detection sensor is configured to measure a temperature of fuel, and the voltmeter is configured to measure a voltage of a battery.

5. The injection control apparatus for a diesel engine according to claim 2, wherein the same ECU is used for each of the valve opening control unit, the opened-state maintaining control unit, and the timing control unit.

* * * * *